United States Patent [19]

Thornton

[11] Patent Number: 5,198,083

[45] Date of Patent: Mar. 30, 1993

[54] ELECTROCHEMICAL CELL AND METHOD OF TREATING WASTE MATERIAL THEREWITH

[75] Inventor: John D. Thornton, Evesham, United Kingdom

[73] Assignee: United Kingdom Atomic Energy Authority, Harwell, England

[21] Appl. No.: 669,417

[22] PCT Filed: Jan. 8, 1990

[86] PCT No.: PCT/GB90/00019

§ 371 Date: Apr. 1, 1991

§ 102(e) Date: Apr. 1, 1991

[87] PCT Pub. No.: WO90/08107

PCT Pub. Date: Jul. 26, 1990

[30] Foreign Application Priority Data

Jan. 11, 1989 [GB] United Kingdom ............ 89 00557.3

[51] Int. Cl.$^5$ ........................ C02F 1/461; C25B 9/00; C25B 7/00

[52] U.S. Cl. ................... 204/149; 204/151; 204/237; 204/239; 204/257; 204/261; 204/262; 204/273; 204/283; 204/263

[58] Field of Search ............ 204/237, 273, 241, 267, 204/269, 284, 149, 257, 263, 283, 259, 239, 262

[56] References Cited

U.S. PATENT DOCUMENTS

| | | | |
|---|---|---|---|
| 906,011 | 12/1908 | Greenawalt | 204/257 |
| 1,227,706 | 5/1917 | Vaygouny | 204/273 X |
| 1,682,426 | 8/1928 | Schütte | 204/273 X |
| 3,702,814 | 11/1972 | Mandroian | 204/273 X |
| 3,941,669 | 3/1976 | Bharucha et al. | 204/105 |
| 3,954,594 | 5/1976 | Recht | 204/263 |
| 4,004,994 | 1/1977 | Andrus | 204/149 |
| 4,587,000 | 5/1986 | Pellegrino et al. | 204/273 |
| 4,696,729 | 9/1987 | Santini | 204/273 X |

FOREIGN PATENT DOCUMENTS

| | | |
|---|---|---|
| 0171478 | 2/1986 | European Pat. Off. |
| 0221187 | 5/1987 | European Pat. Off. |
| 2644199 | 4/1977 | Fed. Rep. of Germany . |
| 2020055 | 7/1970 | France . |
| 2582321 | 11/1986 | France . |
| 2606795 | 5/1988 | France . |
| 907351 | 10/1962 | United Kingdom . |
| 1331251 | 9/1973 | United Kingdom . |
| 1366877 | 9/1974 | United Kingdom . |
| 1367318 | 9/1974 | United Kingdom . |
| 1409419 | 10/1975 | United Kingdom . |

Primary Examiner—Donald R. Valentine
Attorney, Agent, or Firm—William R. Hinds

[57] ABSTRACT

An electrochemical cell (60) and method for treating waste having an anode in the form of a number of elements comprising spheres (80) which locate between plates (78, 81). The spheres (80) divide the anode compartment (64) into parts (110, 111). The porous pot (62) separates the anode compartment from the cathode compartment (63). The electrode liquor is circulated over the elements from part (110) to part (111) by an impeller (86) located in a tube (75) having inlets (77) and outlets (76), the outlets (76) being at a different level from the inlets (77). A rake may stir the contents of chamber (111) particularly for solid waste. There may be a plurality of porous pots, each housing a cathode, in the anode compartment.

19 Claims, 4 Drawing Sheets

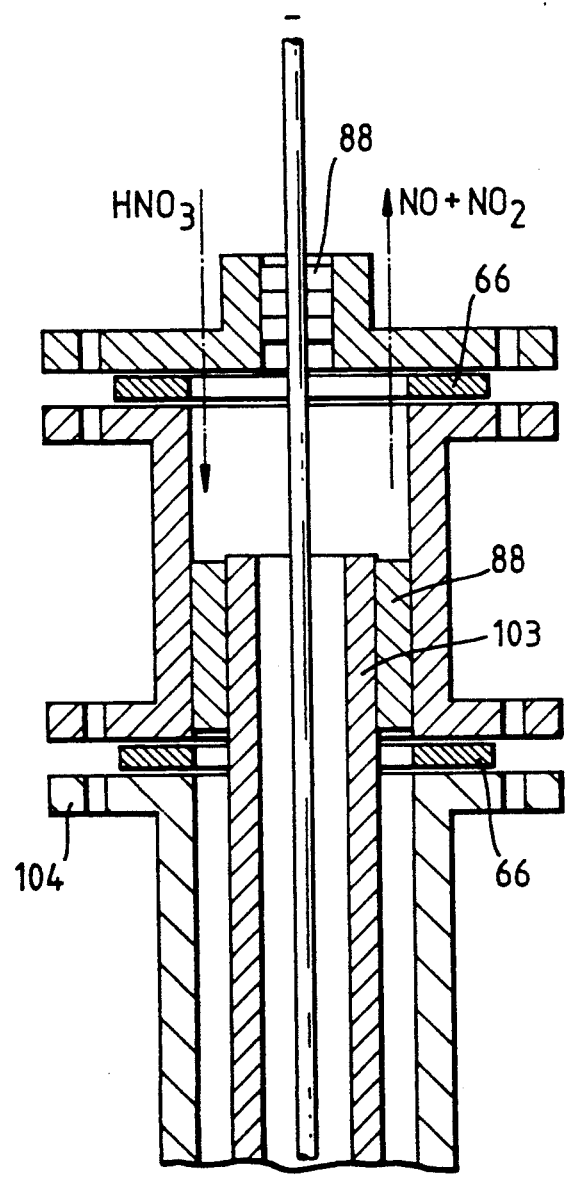

ELECTROCHEMICAL CELL AND METHOD OF TREATING WASTE MATERIAL THEREWITH

This invention relates to electrochemical cells and has particular, but not exclusive, application to cells for use in the disposal of solid contaminated wastes from the nuclear industry.

According to one aspect of this invention, in an electrochemical cell comprising an electrode chamber, an electrode in the chamber, the electrode comprising a plurality of elements that divide the electrode chamber into two parts, and means for circulating electrode liquor from the one part to the other part over and between the elements, the circulating means comprises an impeller, which impeller is in a tube having a liquor inlet in the other chamber part and an outlet in the one chamber part at a different level than the inlet, whereby electrode liquor flows from the outlet through the elements into the other chamber part.

According to another aspect of the invention, in an electrochemical cell comprising an anode compartment and a cathode compartment separated by a porous pot, an electrode in the anode compartment, the electrode comprising a plurality of elements that divide the anode compartment into two parts, and means for circulating electrode liquor from the one part of the other part over and between the elements, there are provided a plurality of cathodes disposed within a respective said porous pot one for each cathode, each respective said pot being disposed in the anode compartment.

The invention also provides a method of use of a cell of the first or the second aspect of the invention in which the electrode liquor includes waste material.

The waste material may be solid.

The invention may be performed in various ways and some specific embodiments with possible modifications will now be described by way of example with reference to the accompanying schematic drawings, in which:

FIG. 4 is an enlarged view of part of FIG. 3.

FIGS. 1 to 4 show cells for use in the disposal of solid contaminated wastes, for example rubber, plastics, paper, but which could be used in the disposal of liquid wastes for example tributyl phosphate/odourless kerosene (TBP/OK).

Figure 1:
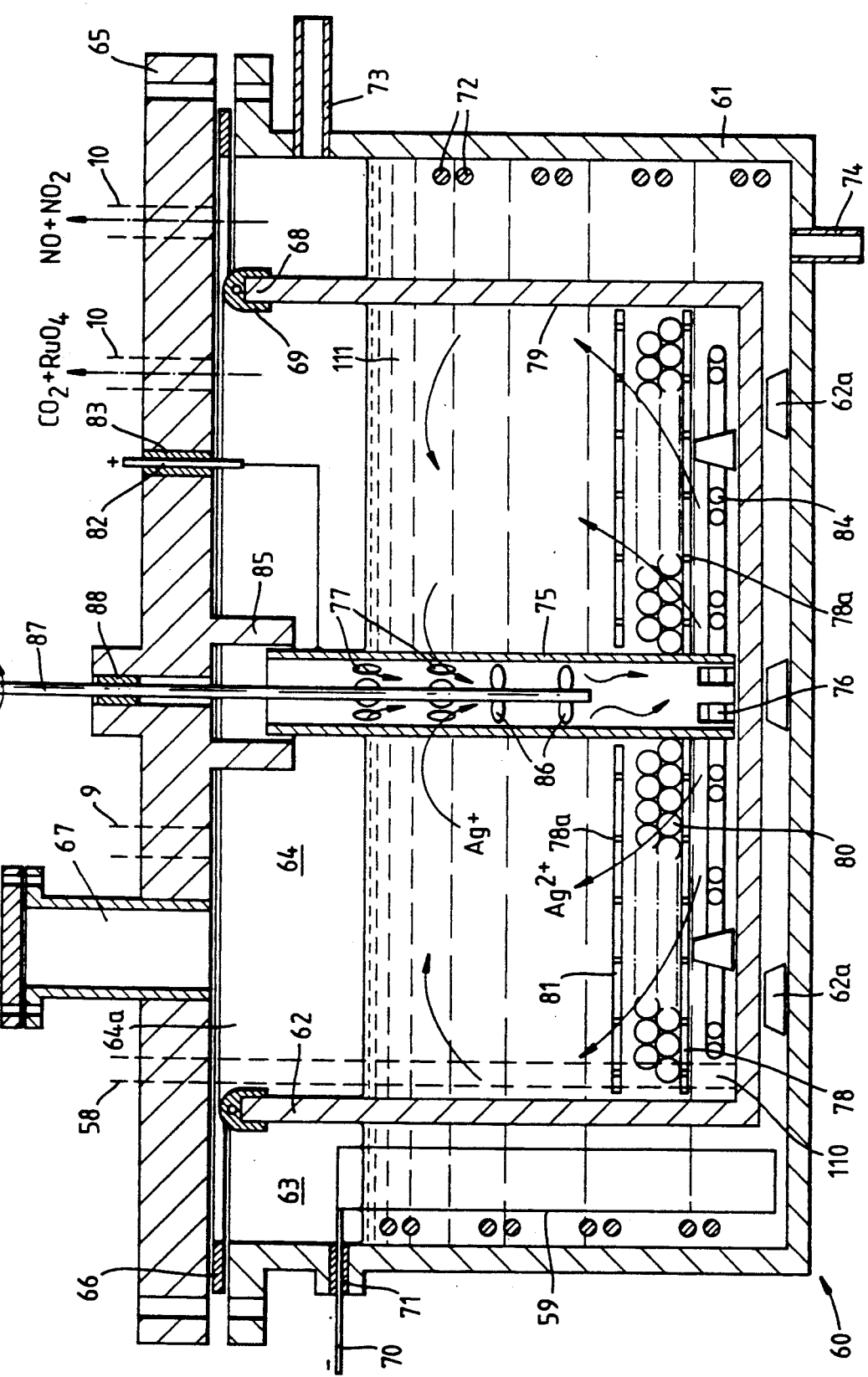
FIG. 1 is a section through a first cell.

The following cells attempt to satisfy certain criteria, viz: 1. Robust construction and ease of charging the waste.

2. Rapid and repeated oxidation of $Ag^+$ to $Ag^{2+}$ ions.

3. Provision of a large compact anode area to promote (2) above.

4. Positive flow patterns to maintain solids in suspension.

The cells to be described are particularly intended for a method of treating waste matter as described in European Patent Specification EP-A-297738 but the cells may find other uses and the invention is not restricted to use in that method. Briefly the method is of treating waste matter in which an aqueous electrolyte comprising nitric acid and containing silver ions as an electrochemically regenerable primary oxidising species is subjected to an electric potential at a temperature above 50° C. to produce secondary oxidising species and the aqueous electrolyte, and the waste matter is added to the electrolyte either continuously or periodically whereby decomposition of the initially and the subsequently added waste matter is predominantly effected by the secondary oxidising species, the primary oxidising species following reduction in the course of the interaction with the aqueous electrolyte being regenerated by the electric potential.

Advantageously, the electrolyte might also include cobalt ions.

For some applications the temperature may be 55° C., but for other applications a temperature range of 55° C. to 80° C., or 70° C. to 90° C. may be used to improve the decomposition process.

The waste matter may be added to the aqueous electrolyte continuously or in a batchwise manner at a rate compatible with the decomposition rate of the previously added waste matter.

The waste matter may be contaminated with toxic material such as radioactive species or it may comprise spent nuclear fuel such as uranium carbide fuel.

The method finds particular application in the case or organically-based waste matter although other applications involving suitable, oxidatively decomposable matter are not excluded. The term "organically-based waste matter" is to be construed as referring both to waste matter which essentially consists of organic groupings and waste matter containing organic groupings and other groupings.

The various types of cells will now be described with reference to the accompanying Figures.

FIG. 1—CELL WITH FORCED CONVECTION COMPOUND ANODE

A cell 60 comprises an outer tank 61 and an inner concentric porous pot 62 which divides the arrangement into a generally annular cathode compartment or chamber 63 and an inner anode compartment or chamber 64. The pot 62 rests on supports 62a.

The anode compartment 64 is filled with an anolyte which may comprise nitric acid and silver nitrate (which provides silver for use as an electrochemically regenerable oxidising species, i.e. divalent silver ions).

The cathode compartment is filled with catholyte comprising nitric acid. Off-gases generated in the course of reaction, e.g. $CO_2$, $RuO_4$, $NO$ and $NO_2$ are removed via suitable nozzles (not shown) for subsequent treatment. The cathode compartment is provided with a drain outlet 74 (normally closed) and the anode compartment is provided with a suction tube 58 for drainage purposes. In operation, the gas space 64a above the anolyte may be maintained below atmospheric pressure so that any imperfections in the sealing arrangements merely result in the small ingress or air into the anode compartment and which may be subsequently vented from an absorber.

The cell 60 is closed by a lid 65 and gaskets 66 are provided to ensure a gas-tight closure. A charging port 67 is provided in the lid for the introduction of solid wastes. The effluent gases from the anode and cathode compartments may if necessary be kept separate by providing the rim 68 of the porous pot 62 with a compressible seal 69 engaging the gasket 66; alternatively, the seal 69 may be omitted and the mixed gases scrubbed downstream of the cell by ancillary units. The liquid feed line to the anode cell, and the gas offtake nozzles, being pipes passing through the lid, have been omitted from the drawing for clarity but are indicated diagrammatically at 9, 10. The cathode compartment is provided with a cathode 59 which may be of platinised titanium and an electrical connection 70 passes through an insulated plug 71 in the wall of the outer tank 61. Double helical cooling coils 72 are provided to control the temperature of the catholyte. Nitric acid is fed through nozzle 73 and drainage is via an offtake 74.

The anode chamber 64 contains a draft tube 75 which has a multiplicity of angularly spaced axial slits 76 at the bottom end and numerous angularly and axially spaced perforations 77 towards the top. The draft tube 75 near its lower end is rigidly attached to a horizontal annular perforated plate 78 with perforations 78a which has a small peripheral clearance with the inner wall surface 79 of the porous pot 62. This assembly comprises the basic anode but in order to provide as much surface area as possible for the rapid oxidation of monovalent silver ions, one or more layers of small platinised titanium spheres 80 (for example 0.64 cm to 1.28 cm or ¼ inch to ½ inch in diameter) are laid on the plate 78 and a second perforated plate 81 may be laid on the top of the spheres 80 to prevent their being entrained by turbulent fluid eddies. The layer or layers or spheres 80 effectively divides the anode compartment 64 into two chambers 110, 111 respectively below and above the spheres. An electrical connection 82 passes through an insulated plug 83 in the lid 65 of the cell and is connected with the top of the electrically conducting draft tube 75 thereby establishing electrical contact with the bed of spheres via the plate 78 on which they rest. Double pancake cooling coils 84 lie beneath plate 78 and are used to control the temperature of the anolyte. The anode compartment may be emptied via a suction tube 58. The draft tube 75 is maintained in a vertical position by an annular hollow boss 85 extending downwards from the lower surface of the lid 65 and which engages with the top of the tube 75. It is necessary to insulate the positively charged draft tube 75 from the lid 65 of the cell, and to this end an electrically insulating collar (not shown) may be either inserted into the hollow boss 85 or else fitted around the top of the draft tube 75. A pair of downward acting marine impellers 86 are attached to a shaft 87 which is co-axial with the draft tube 75 and which passes through a seal 88 in the lid of the cell, the shaft being rotatable by suitable means such as an electric motor (not shown).

The cell is operated by first charging the anode and cathode compartments with acidified silver nitrate solution and nitric acid respectively. The solid waste, which is normally shredded, is next charged through port 67 into the anode compartment and the impeller 86 started. Liquor is drawn into the draft tube 75 through the perforations 77 and passes out through the slits 76 into the chamber 110 beneath the plate 78 and thence through the bed of spheres 80 and thence back into the bulk anode liquor in chamber 111. The spheres 80 provide an extended anode surface where $Ag^+$ ions are oxidised to $Ag^{2+}$ which in turn oxidise the organic waste before returning to the monovalent form. The continuous fluid circulation through the anode ensures rapid reoxidation of the silver ions to $Ag^{2+}$ and hence good cell efficiency. In a modification the impeller is operated to produce flow in through slits 76 and out through perforations 77. The bed of spheres 80 is not fluidised; the spheres remain essentially static. The waste is maintained in suspension.

FIG. 2—CELL WITH PUMPED COMPOUND ANODE

The circulation in FIG. 1 may, on occasions, be insufficient to maintain dense waste material in suspension. In such cases, the alternative cell shown in FIG. 2 may be used. The operation is similar to FIG. 1 except that the draft tube 75 is replaced by a gate type impeller or rake 90 to provide positive stirring and agitation in the anode chamber 111. The anolyte is withdrawn through a vertical perforated tube 91 and returned via an external pump 92 to a second horizontal perforated tube 93 located in chamber 110 beneath the bed of spheres 80. This arrangement provides rapid and controlled fluid circulation through the anode irrespective of the rate of rotation of the rake.

A range of rake arrangements could be provided. Again, fluid feed and exit points have been omitted for clarity.

FIGS. 3, 4—CELL WITH POCKETED CATHODES

The cells described so far all make use of a concentric porous pot 62 to form the anode compartment. This form of construction becomes increasingly expensive with scale and may set a limit to the largest size of cell that can be constructed.

Figure 3:
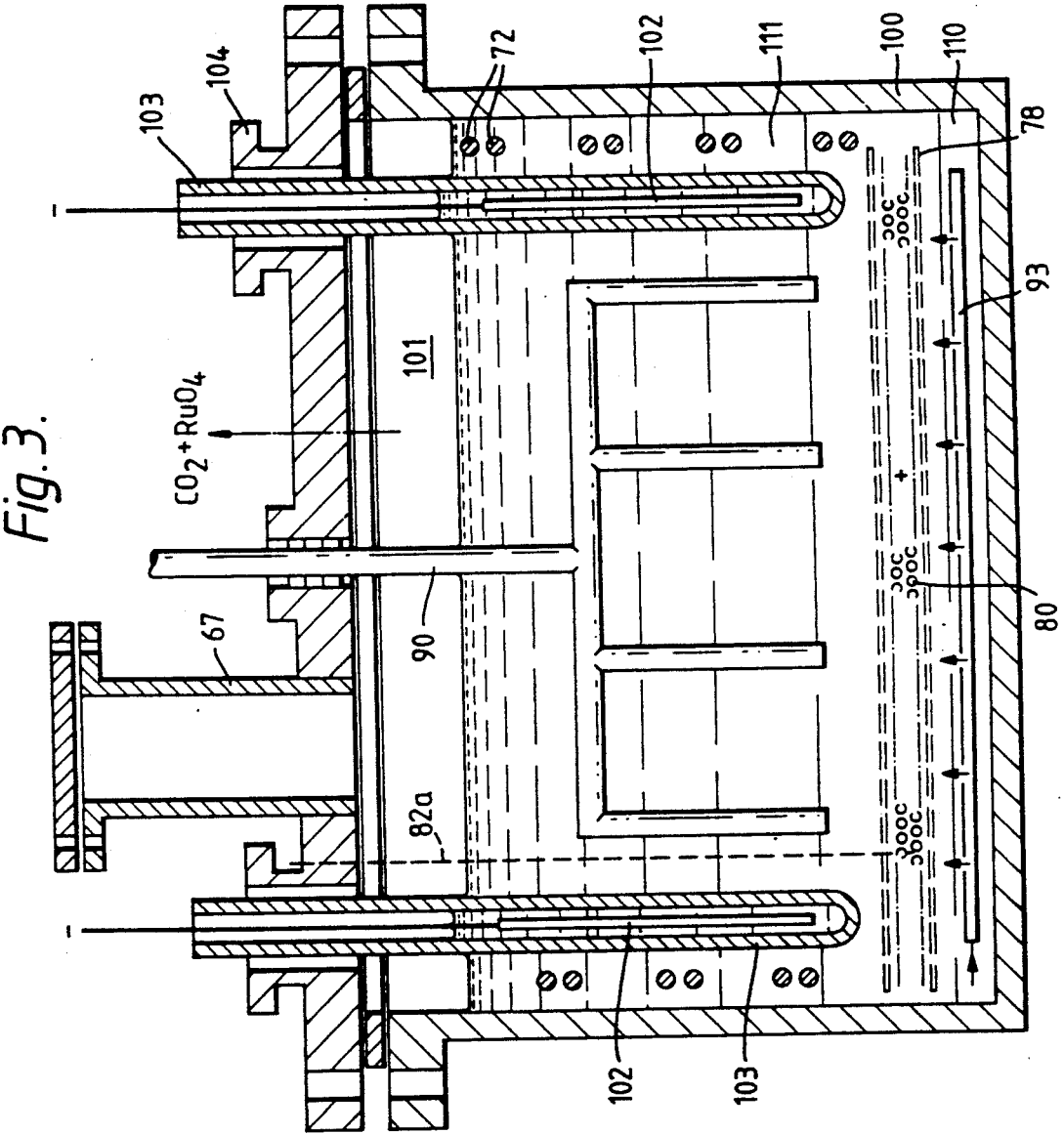
FIG. 3 is a section through a third cell.

FIG. 3 shows a form of construction in which this constraint no longer operates. The porous pot is omitted and the main tank 100 defines the anode chamber 101. One or more cathodes 102 are immersed in trembles or pockets of porous pot 103 containing catholyte which in turn are immersed in anoltye.

Any number of cathodes may be provided on this basis and they may be hollow and water cooled if necessary to control the temperature of the catholyte. The top of each porous thimble passes through a flange 104 into a header chamber of the type shown in FIG. 4. Various methods may be employed to seal the porous thimble into the header such as a mechanical seal or a cement seal. Additional catholyte is fed to the pots via the header and when a multiplicity of cathodes are used, the thimbles may be coupled together and fed from a common reservoir. Provision may then be made if necessary to control the catholyte level automatically in each thimble using known level sensors controlling the supply.

Figure 2:
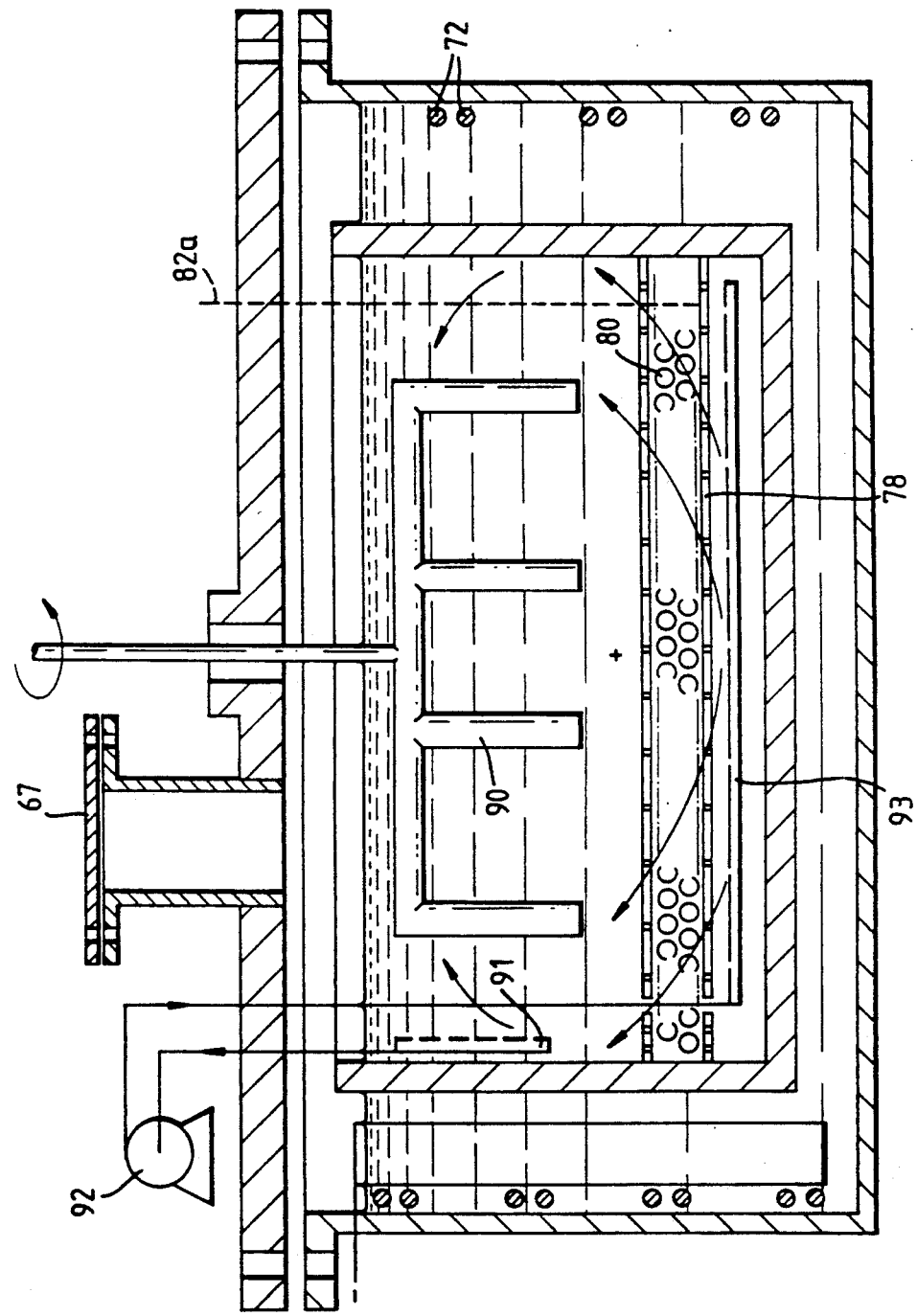
FIG. 2 is a section through a second cell with some parts omitted.

Such thimbles are used in filtration and the adjustment of porosity and fabrication is cheaper than the very large pots shown in FIGS. 1 and 2. Furthermore, constraints are removed on the ultimate size of the cell.

FIG. 3 is self explanatory, the anode compartment being similar to that shown in FIG. 2. Thus 90 is the stirrer; 67 the charging port; 80 the extended surface anode and 93 the perforated distributor tube from which the pumped anolyte is fed to the anode, the pump 92 being omitted for clarity. The pump lines have been omitted for clarity and are the same as those shown in FIG. 2. Again, a double helical coil 72 adjacent to the wall of the tank is used to control the temperature of the anolyte. In this arrangement, no separate cooling system is used for the catholyte. Heat is transferred (via the porous thimbles) to the anolyte. Heat is then removed by the cooling coils in the anolyte. If necessary, additional cooling of the catholyte can be effected by employing water cooled cathodes. Electric connected to the anode is indicated at 82a.

The bed of spheres could be used as a cathode, and an electrochemical cell according to the invention could have an anode and a cathode each comprising a bed of spheres.

In a modification the anode and cathode compartments may be separate and connected by a conduit including a porous membrane separating the anolyte and catholyte but permitting contact between them.

By varying the rate of operation of the impeller or pump the rate of flow of electrode liquor over and between the spheres can be varied as desired and to suit particular operating circumstances, e.g. the amount and nature and size of solid waste.

I claim:

1. An electrochemical cell having an electrode chamber, an electrode in the chamber, the electrode comprising a plurality of elements that divide the electrode chamber into two parts, and means for circulating electrode liquor from the one part to the other part over and between the elements, wherein the improvement comprises the circulating means comprises an impeller, which impeller is in a tube having a liquor inlet in the other chamber part and an outlet in the one chamber part at a different level than the inlet, whereby electrode liquor flows from the outlet through the elements into the other chamber part.

2. A cell as claimed in claim 1, in which the elements comprise spheres.

3. A cell as claimed in claim 2, in which the spheres form layers.

4. A cell as claimed in claim 3, in which the layers are located between perforated plates.

5. A cell as claimed in claim 1, including heat exchange means for maintaining the temperature of the electrode liquor within a predetermined range.

6. A cell as claimed in claim 1, in which the electrode is an anode, and the electrode chamber comprises the anode compartment.

7. A method of treating waste material, the method comprising the steps of (a) using an electrochemical cell having an electrode chamber, an electrode in the chamber, the electrode comprising a plurality of elements that divide the electrode chamber into two parts, and means for circulating electrode liquor from the one part to the other part over and between the elements, the circulating means comprising an impeller, which impeller is in a tube having a liquor inlet in the other chamber part and an outlet in the one chamber part at a different level than the inlet, whereby electrode liquor flows from the outlet through the elements into the other chamber part, (b) disposing the waste material in the other chamber part, and (c) adding waste material to the other chamber part at a rate compatible with the decomposition rate of previously added said waste material.

8. A method as claimed in claim 7, in which the waste material comprises organic material, and the electrode liquor comprises nitric acid and silver nitrate.

9. An electrochemical cell having an anode compartment and a cathode compartment separated by a porous pot, an electrode in the anode compartment, the electrode comprising a plurality of elements that divide the anode compartment into two parts, and means for circulating electrode liquor from the one part to the other part over and between the elements, wherein the improvement comprises a plurality of cathodes disposed within a respective said porous pot, one respective said porous pot for each cathode, each respective said porous pot being disposed in the anode compartment.

10. A cell as claimed in claim 9, in which the elements comprise spheres.

11. A cell as claimed in claim 10, in which the spheres form layers.

12. A cell as claimed in claim 11, in which the layers are located between perforated plates.

13. A cell as claimed in claim 9, including heat exchange means for maintaining the temperature of the electrode liquor within a predetermined range.

14. A cell as claimed in claim 9, in which the circulating means comprises an inlet in the other part, an outlet in the one part, and pump means connected between the inlet and the outlet.

15. A cell as claimed in claim 9, including means for stirring liquor in the other part.

16. A cell as claimed in claim 15, in which the stirring means comprises a rotatable rake suspended in the other part.

17. A method of treating waste material, the method comprising the steps of (a) using an electrochemical cell having an anode compartment and a cathode compartment separated by a porous pot, an electrode in the anode compartment, the electrode comprising a plurality of elements that divide the anode compartment into two parts, and means for circulating electrode liquor from the one part to the other part over and between the elements, a plurality of cathodes disposed within a respective said porous pot, one respective said porous pot for each cathode, each respective said porous pot being disposed in the anode compartment, (b) disposing the waste material in the other part, and (c) adding waste material to the other part at a rate compatible with the decomposition rate of previously added said waste material.

18. A method as claimed in claim 17, in which the waste material comprises organic material, and the electrode liquor comprises nitric acid and silver nitrate.

19. An electrochemical cell comprising:
a) a large chamber for containing electrode liquor;
b) a plurality of narrow tubular porous pots extending downwardly into the chamber;
c) a respective cathode extending inside each said porous pot;
d) two perforated metal plates displaced from each other in parallel relationship, said plates being disposed in the lower portion of the chamber so as to extend across the chamber and substantially divide the chamber into a relatively large upper part and a relatively small lower part;
e) a plurality of electrically conductive spheres retained as a layer between the plates in electrical contact with each other and with the plates;
f) heating coils disposed around the interior of the upper part of the chamber so as to control the temperature of the electrode liquor;
g) a rotatable rake suspended in the upper part of the chamber for stirring the electrode liquor;
h) a recirculation circuit connected between the upper part and the lower part of the chamber, for circulating electrode liquor from said upper part to said lower part;
i) pump means connected in the recirculation circuit, said pump means being controllable so as to vary the rate of flow of electrode liquor from the upper part to the lower part of the chamber to suit operating circumstances, and
j) an entry port into the upper part for waste matter to be treated and located above the upper part of the chamber.

* * * * *